United States Patent

[11] 3,579,950

[72] Inventor Glenn V. Davis
       Watertown, N.Y.
[21] Appl. No. 788,753
[22] Filed Jan. 3, 1969
[45] Patented May 25, 1971
[73] Assignee Borden, Inc.
       New York, N.Y.

[54] METHOD OF AND APPARATUS FOR OBVIATING SPILLAGE IN MOVING CONTAINERS
4 Claims, 4 Drawing Figs.
[52] U.S. Cl. ........................................... 53/37,
       53/282, 141/171, 141/180
[51] Int. Cl. ........................................... B65b 3/04,
       B65b 7/28
[50] Field of Search ........................................... 53/37, 167,
       282, 367; 141/168, 171, 180; 198/33 (RZ)

[56] References Cited
UNITED STATES PATENTS
3,124,916  3/1964  Anderson et al. ...............  53/282X
3,293,823  12/1966  Anderson .....................  53/282X Primary Examiner—Theron E. Condon
Assistant Examiner—Robert L. Spruill
Attorneys—John L. Sigalos and Charles C. Parsons ABSTRACT: The present invention relates to a high-speed conveyor-type canning machine comprising means for supplying containers, means for affixing closures on a filled container, comestible depositing means interposed between said supplying means and said affixing means, means for continuously advancing said containers to said depositing means and said affixing means, and means for intercepting and rotating said container prior to positioning same beneath said closure affixing means whereby a vortex is induced in said comestible to prevent overflow.

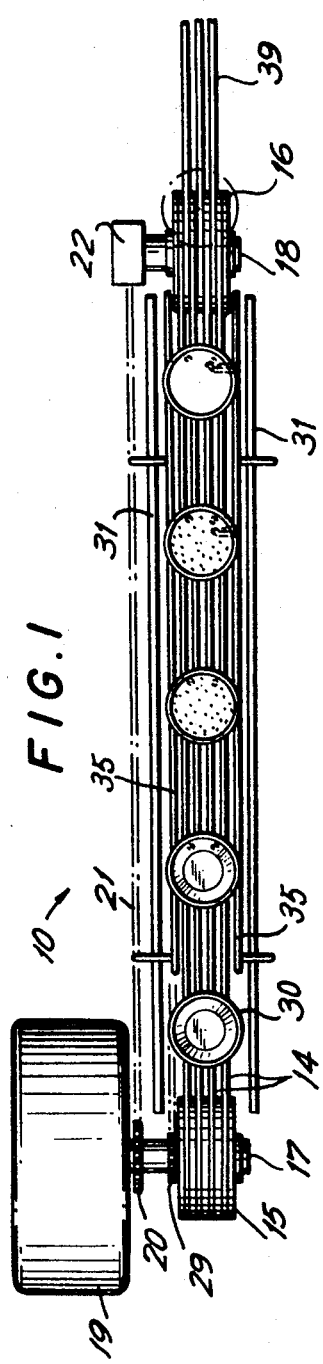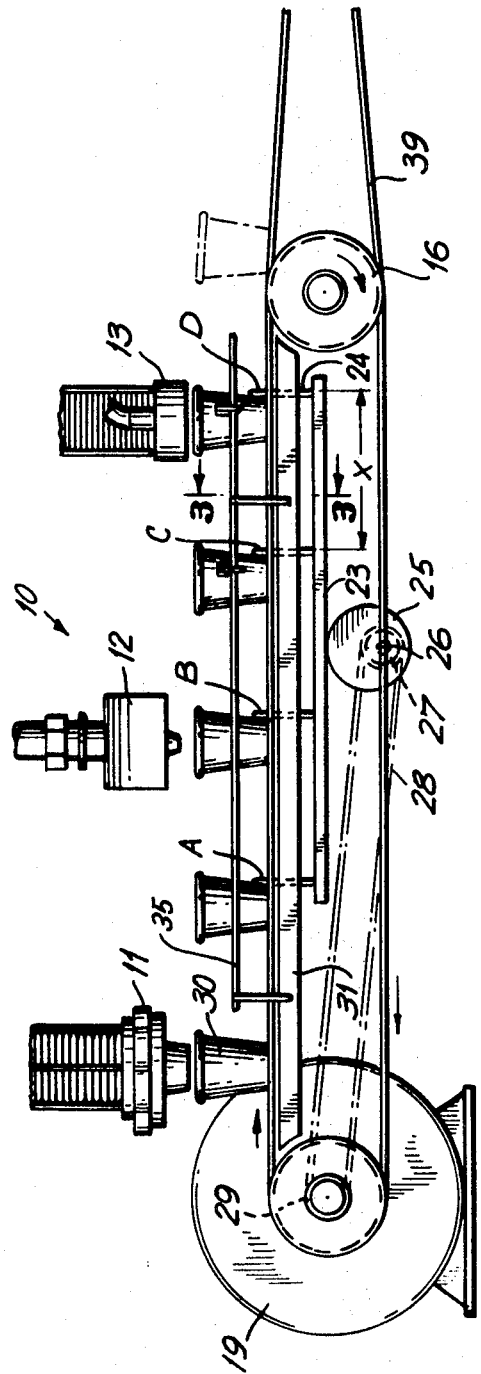

PATENTED MAY 25 1971 3,579,950

INVENTOR.
GLENN V. DAVIS

BY

ATTORNEY

METHOD OF AND APPARATUS FOR OBVIATING SPILLAGE IN MOVING CONTAINERS

BACKGROUND OF THE INVENTION

Heretofore, conveyor apparatus have been used to transport a continuous supply of empty cylindrical containers beneath liquid-comestible-dispensing apparatus and thereafter advancing the filled container beneath a cap- or closure-affixing device to produce sealed containers. This apparatus has found widespread acceptance in the cottage cheese, yogurt and molten comestible industry because it produces, in high volume and hygienically, a continuous stream of comestible-filled containers.

Unfortunately, comestible wastage in using the machine occurs frequently because the filled containers are moved, at high speed, from one station to the next and are subjected to sudden halts as they are positioned at the subsequent station. Consequently, spillage or overflow of the comestible occurs during the positioning. Such spillage includes the concomitant, and perhaps more significant, disadvantage of presenting, for capping, a container having less content that is advertised on the label. This has dual result of alienating consumers who purchase the unfilled containers as well as rendering the manufacturer liable to charges of false advertising.

Reduction in the speed of the machine is ordinarily not desirable, if permissible at all because of the unsustainable output diminution. Accordingly, the prior art has been unable to provide a high-speed conveyor-type canning machine for liquid comestibles that exercises sufficient control over the filled container, during transit, to prevent overflow.

SUMMARY OF THE INVENTION

The present invention overcomes the stated deficiencies in the prior art and has as its primary object the elimination of comestible loss from overflow in high-speed conveyor-type canning operations. More specifically, the present invention suggests means for inducing a vortex in the liquid comestible, during transit, just prior to being brought to a sudden halt.

Briefly stated, the present invention comprises means for supplying said containers, means for affixing closures on a filled container, comestible depositing means interposed between said supplying means and said affixing means, means for continuously advancing said containers to said depositing means and said affixing means, and means for intercepting and rotating said container prior to positioning same beneath said closure-affixing means whereby a vortex is induced in said comestible to prevent overflow.

BRIEF DESCRIPTION OF THE DRAWINGS

The various features of the apparatus of this invention will become apparent from the following detailed description set forth in connection with the accompanying drawings which relate to the preferred embodiment of the present invention and are given by way of illustration.

FIG. 1 is a top view with the cup-dispensing, comestible-injecting, and cap-affixing apparatus removed.

FIG. 2 is a side view of the preferred embodiment of the present invention.

DETAILED DESCRIPTION OF THE INVENTION

Figure 3:
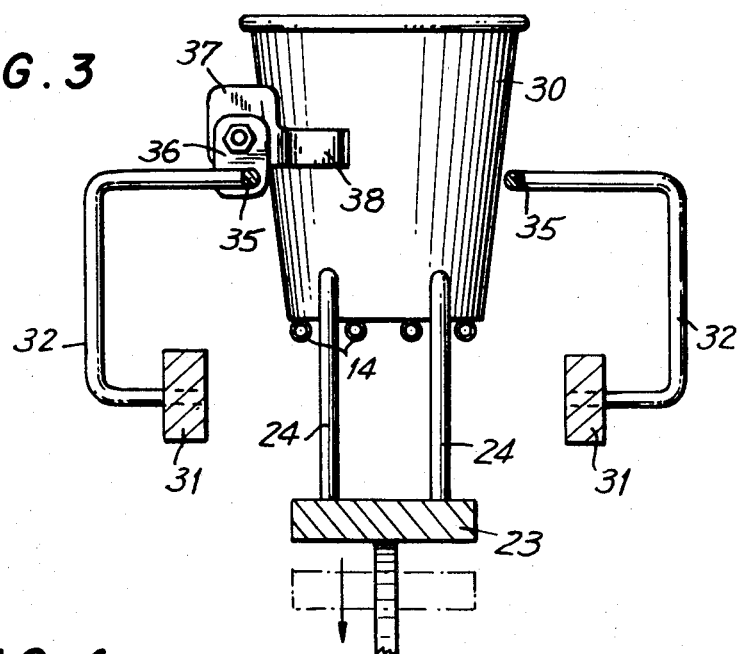
FIG. 3 is a cross section view taken along the line III—III of FIG. 2.
Figure 4:
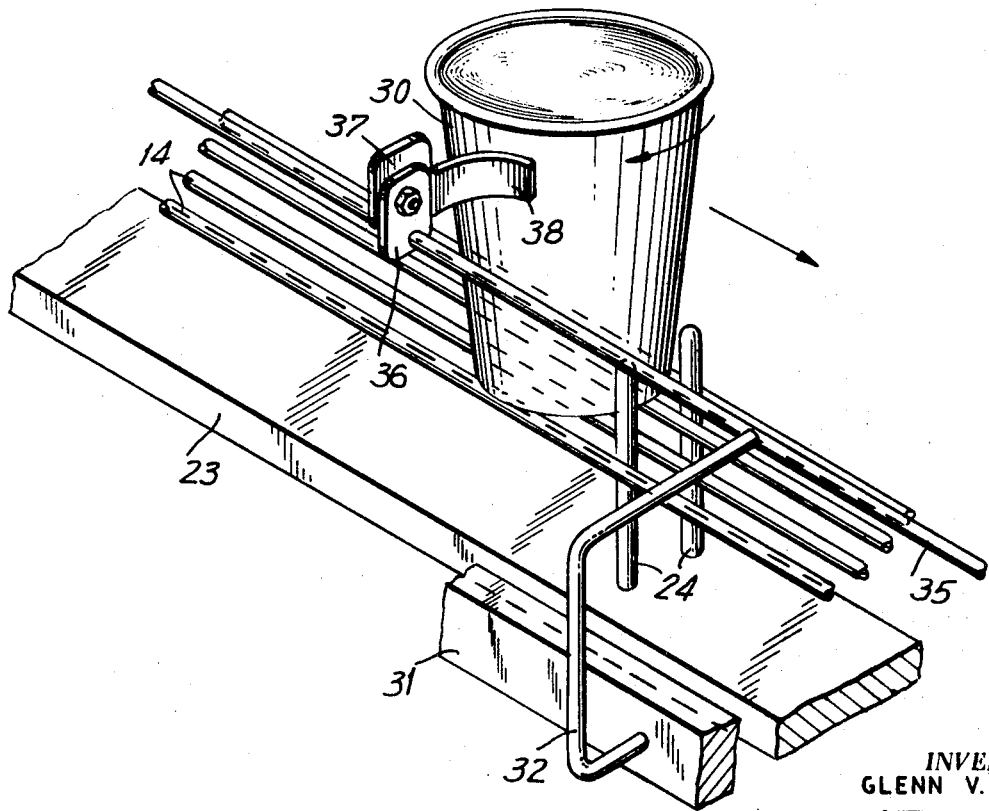
FIG. 4 is a detailed view of the rotational effect imparted to the moving comestible-filled container.

Referring to the preferred embodiment of the present invention, the assembly 10 comprises a conventional container or cup dispenser 11, a liquid comestible injection apparatus 12, and a cap-affixing apparatus 13 disposed preferably in parallel relation as shown in FIG. 2. A plurality of conveyor belts 14 are entrained about spaced, parallel, horizontally disposed cylinders 15 and 16, the latter members being secured to parallel rotatable shafts 17 and 18 respectively.

The shaft 17 is driven by a conventional motor 19 such as electric, pneumatic, hydraulic or internal combustion engine. A spur gear 20 is disposed on the shaft 17 about which is entrained a chain 21 which extends between the two parallel shafts and engages spur gear 22 on shaft 18 to insure timed rotational movement between the two shafts. The conveyor is disposed beneath the assembly 10 so that cups from the nested stack in the dispenser are continuously placed, in equally spaced relation, on the moving belts as is well known in the art. A longitudinal brace 23 is situated beneath and parallel to the upper conveyor belt level and is mounted for movement in a vertical plane only, by guides or the like. A plurality of upwardly projecting, spaced, parallel prongs 24, situated in pairs and designated A, B, C and D, are positioned on the upper surface of the brace and are spaced transversly thereon for reception between the conveyor belts 14, when the brace is moved upwardly.

A cam 25, disposed on a journaled shaft 26, is positioned beneath the brace 23 and contacts the lower face of said brace to move the latter vertically as the cam is rotated. A spur gear 27 is affixed to shaft 26 about which is entrained chain 28. The chain extends about the spur gear 29 on the driven shaft 17 to insure timed rotational movement of the cam 25 with the rotational movement of cylinder 15 which drives the conveyor. Consequently, the longitudinal brace 23 moves vertically upwardly to position the prongs 24 between the belts 14 in accordance with the linear movement of the conveyor.

In the preferred embodiment, the dimensional spacing of the prong pairs on the brace is determined by the rate of feed of the cup dispenser, the linear velocity of the conveyor, and the distance between the comestible-injecting and cap-affixing apparatus. In practice, the cup dispenser places cups on the conveyor belts at a predetermined rate and the velocity of the conveyor is maintained at a constant speed. The prong pairs B and D are spaced on the brace adjacent the injecting and affixing stations so that the movement of the cup will be arrested to position one cup beneath the injection device and the forwardmost cup will be positioned beneath the cup-affixing device. Conventionally, the feed rate of the dispenser necessitates the inclusion of prong pairs A and C, equally spaced on opposite sides of prong pairs B, to preclude movement of cups disposed intermediate the injecting and affixing stations to preserve the timing of the process as the other cups are being filled and capped. The cam 25 makes one complete rotation during the period one cup moves the distance between one prong pair.

Disposed on opposite sides of the conveyor are a pair of longitudinally extending supports 31 rigidly secured in a conventional manner. A pair of oppositely disposed C-shaped rods 32 are secured on the outer face of the supports mount a pair of longitudinally extending guides 35 which preclude tilting of the cups transversely as they are advanced on the conveyor. A pair of upright braces 36 are releasably secured to the guide 35 on one side thereof for longitudinal adjustment. A flexible resilient base 37 is juxtaposed and secured to the brace 36 and includes an integral arm 38 projecting inwardly into the path of travel of cups. A resilient base and arm, preferably made of rubber or the like, are spaced on the guide a preselected distance from the point when prongs C and D intercept the cups filled with molten comestible from comestible-injection device 12.

The purpose of each arm is to contact a filled cup prior to interception of same by the prong pairs C and D. The resilient arm is twisted about a vertical axis in the direction of travel of the cups and imparts a rotational movement thereto. This rotation of the cup, about a vertical axis, induces a vortex in the fluid mass contained therein which precludes spillage of the contents when the fast moving cup is suddenly halted by prong contact. Absent rotation by the arm, the inertia built up in the comestible mass by the cup momentum would cause overflow and, consequently, greatly increased product yield is realized by its use.

Once the cap is affixed by the conventional capping apparatus 13, the sealed container is conveyed away by conveyors 39 entrained about the cylinder 16 where they are packaged.

Although one embodiment of the present invention has been herein illustrated and described, it will be evident to those skilled in the art that various modifications may be incorporated into the details of production without departing from the principles herein set forth.

I claim:

1. Apparatus for producing a continuous supply of sealed, liquid filled containers comprising:
    means for supplying open cylindrical containers;
    means for affixing closures on the filled containers;
    liquid-depositing means interposed between said container-supply means and said closure-affixing means;
    conveyor means for continuously advancing said containers from said container-supply means to said liquid-depositing means and said closure-affixing means;
    arresting means for positioning said containers beneath said liquid-depositing means and said closure-affixing means;
    means for projecting and retracting said arresting means into and out of the path of the moving containers; and
    means for inducing a vortex in said liquid to obviate spillage of said liquid prior to said closure affixation, said means including means disposed adjacent to but on the trailing side of said arresting means for intercepting and rotating said containers just prior to positioning same beneath said closure-affixing means.

2. Apparatus according to claim 1 wherein said intercepting means includes a resilient arm which projects across the path of travel of the containers between said depositing means and said affixing means.

3. Apparatus of claim 1 wherein said arresting means includes at least one pair of prongs and said rotating means includes at least one resilient arm projecting into the path of the containers whereby contact of the containers with said resilient arm is prior in time to the contact with said pair of prongs.

4. The method for producing a continuous supply of sealed, liquid-filled containers comprising the steps:
    a. supplying open containers onto a continuously moving conveyor;
    b. advancing the containers to a liquid-depositing apparatus where a liquid is injected to substantially fill the containers;
    c. advancing said substantially filled containers away from said liquid-depositing means toward a closure-affixing apparatus;
    d. arresting movement of said containers to position same beneath the liquid-depositing apparatus and the closure-affixing apparatus;
    e. Inducing a vortex in the liquid in said containers to obviate spillage by rotating said containers prior to arresting movement of same and prior to closure affixation; and
    f. affixing a closure on each of said containers.